US008707909B2

(12) United States Patent
Bordeaux

(10) Patent No.: US 8,707,909 B2
(45) Date of Patent: Apr. 29, 2014

(54) BLIND ANIMAL HALO GUIDE

(76) Inventor: Silvie Bordeaux, Sherman Oaks, CA (US)

( * ) Notice: Subject to any disclaimer, the term of this patent is extended or adjusted under 35 U.S.C. 154(b) by 0 days.

(21) Appl. No.: 13/506,802

(22) Filed: May 17, 2012

(65) Prior Publication Data

US 2013/0306001 A1 Nov. 21, 2013

(51) Int. Cl.
*A01K 13/00* (2006.01)

(52) U.S. Cl.
USPC .......................................... 119/850; 119/856

(58) Field of Classification Search
USPC ......... 119/856, 850, 792, 793, 815, 821, 823, 119/831, 832, 837, 766
See application file for complete search history.

(56) References Cited

U.S. PATENT DOCUMENTS

| | | | |
|---|---|---|---|
| 2,513,969 A * | 7/1950 | Rose et al. ..................... | 119/850 |
| 4,036,179 A | 7/1977 | Turner et al. | |
| 4,476,814 A | 10/1984 | Miller | |
| 4,799,458 A | 1/1989 | Goshorn et al. | |
| 5,012,764 A | 5/1991 | Fick et al. | |
| 6,367,424 B1 * | 4/2002 | Higham ........................ | 119/850 |
| 2005/0263101 A1 * | 12/2005 | Jenny et al. ................... | 119/792 |
| 2006/0278177 A1 * | 12/2006 | Crawford ...................... | 119/850 |
| 2009/0250016 A1 * | 10/2009 | Stampoultzis ................ | 119/850 |
| 2010/0024745 A1 * | 2/2010 | Harlow ......................... | 119/856 |
| 2011/0297107 A1 * | 12/2011 | Kostelec ....................... | 119/850 |
| 2012/0037093 A1 * | 2/2012 | Markfield ..................... | 119/815 |
| 2012/0247400 A1 * | 10/2012 | Hoffmann ..................... | 119/850 |
| 2013/0055968 A1 * | 3/2013 | Lippincott .................... | 119/821 |
| 2013/0276719 A1 * | 10/2013 | Ferrando ...................... | 119/850 |

OTHER PUBLICATIONS www.wagtailfarms.com neck hug with halo Feb. 2012.
www.angelvest.homestead.com Angel vest.

* cited by examiner

*Primary Examiner* — Kimberly Berona
*Assistant Examiner* — Morgan T Barlow

(57) ABSTRACT

A blind animal halo guide that is in the form of a harness, having a neck cushion that fits around the top circumference of the animal's neck to guide and protect the visually impaired animal from bumping into objects, causing injury or harm to the animal. The neck cushion holds a protective halo in place around the dogs head protecting its head, eyes, nose, and shoulders. The halo provides protection for the blind or visually impaired animal, from bumping into objects, while enabling the animal to feel its way around to participate in activities. This device specifically provides protection and guidance for the visually impaired animal, while also providing maximum comfort and does not inhibit the animal's movements, so the animal can lick itself, eat, drink, nap, sleep and participate in other normal daily living activities.

8 Claims, 4 Drawing Sheets

BLIND ANIMAL HALO GUIDE

BACKGROUND

Prior Art

The following is a tabulation of some prior art that presently appears relevant:

U.S. Patents

| Patent Number | Issue Date | Patentee |
|---|---|---|
| 4,036,179 | July 1977 | Turner et al. |
| 4,476,814 | Oct. 16, 1984 | Miller |
| 4,799,458 | Jan. 14, 1989 | Goshorn et al. |
| 5,012,764 | May 7, 1991 | Fick et al. |
| 6,367,424 | Apr. 9, 2002 | Higham |

Non Patent Literature Documents

Wag Tail Farms "Neck Hug" website: www.wagtailfarms.com

Littlest Angel Vest "Angel Vest" website: www.angelvest.homestead.com

BACKGROUND OF THE INVENTION

A device for blind animals, dogs specifically, who lose their eyesight and can hurt themselves by bumping into walls and other obstructions, causing them to lose interest in moving around, for fear of physical harm. It specifically relates to devices that help to guide and protect visually impaired animals, with a protective hoop or halo that is placed around the head and neck area for protection. This device helps the blind or visually impaired animals, so they can stay active by feeling their way around while getting to know their surroundings, without harming themselves.

DESCRIPTION OF RELATED ART

A number of devices have been created to protect blind or visually impaired animals from injury and prevent them from bumping into objects, by using a halo or harness that surrounds the animal's head, and serves to guide and protect it during daily activities. U.S. Pat. No. 6,367,424 to Higham is a body harness that fits along the forward trunk portion of the animal's body, to hold a protective hoop in place on the harness, with the hoop-shaped portion extending around the animal's head and neck area. This is to protect the animal from bumping into objects and provides neuromuscular feedback to the animal, so they know when there is an obstruction, without experiencing hard collisions with the object. This harness poses many problems to the animal because it is large, very restraining, and uncomfortable. It is also cumbersome, with the longer extended hoop portion having no cushion in the neck and shoulder area for comfort. If the animal wanted to take a nap, it would pose some discomfort with the extended portion of the hoop rubbing up against the shoulders or the neck area of the animal. This is a very uncomfortable device, requiring the animal owner to take it off more frequently for the animal's comfort, therefore limiting its use for daily activities such as napping or sleeping. This is also similar to the angel vest from www.angelvest.homestead.com.

Other devices such as U.S. Pat. No. 4,799,458 to Goshorn (1989), U.S. Pat. No. 4,036,179 (1997) to Turner and U.S. Pat. No. 4,476,814 (1984) to Miller are similar devices, but these are equally as uncomfortable as Higham's device and are even more restraining to the animals' activities of daily living.

Another cone-like device that surrounds the neck area, such as U.S. Pat. No. 5,012,764 to Fick et al., was created to protect the dog from licking itself. Turner, Fick and Millers' devices are all for the purpose of preventing the animal from reaching surgical areas with its mouth. Goshorn's device is for the purpose of restraining an animal's head and neck from moving completely. Similarly, Wag Tail Farms, www.wagtailfarms.com in February 2012, added a protective halo to their neck hug device, per my directions as experimentation for my blind dog. Their device completely surrounds the neck area of the dog, and they added a protective halo extension to it, upon my request. Although this device held the halo in a protective position, their product is also specifically designed for dogs that require restraint from licking and is very restrictive. The neck hug is suitable for dogs that need to be restrained after surgery or stitches, however, it is too restrictive for a visually impaired dog that is otherwise healthy. This device greatly inhibits the natural movements and activities of the dog in many other ways, as the neck hug completely surrounds the neck area, preventing the dog from moving its chin downward or from side to side. It also poses a problem for the dog to eat, as the cushion under the chin causes the dog to have to lift up the halo portion, against the floor or onto the side of the dish, in order to eat or drink. This is because the dog is not able to bend its chin downward to accommodate the halo attachment and this causes it to strain while eating. The device also gets food and drink spilled on it, especially under the chin area, therefore the owner has to wash the device more often after meals. The cushion also poses problems if the dog goes to rest its chin to sleep, as it does not allow the dog's neck to rest in the natural lower resting position, so it is forced to rest with its neck in an elevated upward position. This can be very tiring for the animal's neck. The bottom portion of this device, specifically the bottom half of the cushion, is unnecessary for animals that are simply visually impaired and are otherwise healthy. This device greatly inhibits the normal movements and activities of a visually impaired, but otherwise healthy dog unnecessarily.

All of these devices suffer from a number of disadvantages:
(a) The devices surrounding the upper portion of the animal's trunk is larger and longer with the placement of the hoop being further back, making it more cumbersome for the animal to carry and move around.
(b) All of the devices thus far, have either no cushion or too much cushion surrounding the whole neck area, causing discomfort and restricting movement, activities, and resting positions for the animal wearing it.
(c) The harness and angel vest device have no cushion, with a longer extending hoop that can cause discomfort to the animal, by rubbing up against the neck and shoulder area, in addition to being heavy and restraining.
(d) The neck hug device has too much cushion that surrounds the neck area and greatly inhibits the movement of the chin up and down, side to side and makes it difficult for the animal with an eyesight condition.
(e) The neck hug device gets in the way when the animal eats and drinks The hoop portion hits the bowl, and the animal has to push it out of the way either up against the floor or the bowl, because the dog cannot move its chin downward, to accommodate the hoop.

(f) The cushioned device under the chin area gets wet and dirty with water and food, when the animal eats and drinks, making it necessary for the dog's owner to clean the device more often.

SUMMARY

In accordance with the above-stated problems, the preferred embodiment of this device is a blind animal halo guide, comprising of a sturdy neck cushion that is a half circular shape to be secured to the collar portion of the dog harness. This cushion attachment sits on the top circumference portion of the dog's neck, with a protective halo attached onto the neck cushion. This extends the protective halo around the dog's head and is positioned to protect its eyes, nose, and shoulder area from injury. It also provides protection and comfort, while allowing the dog to move its neck and head up and down, from side to side and to perform all of its normal daily activities.

ADVANTAGES

This blind animal halo guide is both comfortable and protective for the animal. The halo is attached to a neck cushion that is attached onto the top portion and circumference of the dog's neck. The device is not restraining, so the dog can move its neck to perform normal daily activities. The neck cushion is held conveniently in place with the hook and loop material, that is located on the upper collar portion of the harness. The neck cushion sits on the upper portion and circumference of the dog's neck perfectly. This provides maximum comfort, while the neck cushion holds a protective halo in place around the neck and head area of the dog, to protect and guide it. This is also accomplished without discomfort and without the halo getting in the way of activities or rubbing up against the dog's neck and shoulder area. This device also provides all the room for the dog's chin to move up and down or from side to side, so that it can eat, drink, rest or sleep without inhibiting natural movements or the daily living activities. The cushion also provides the perfect extension for the halo attachment, to provide the right girth to the halo around the dog's head. It creates a half-circular shape halo extending in front of the dog's eye area, extending outward and around the dog's head, neck and shoulder area. The halo attachment is also shorter than the previous devices because the placement of the halo is closer to the neck and head portion of the dog. It is not cumbersome or restraining in any way. The neck cushion is sturdy and lightweight and it holds the halo in place, to protect the dog from bumping into things. There is nothing obstructing the chin or neck area, by eliminating any unnecessary extra cushioning such as in the neck hug device. This provides the dog with lots of room to move its chin in any direction, without being inhibited in any way by any of the parts of this device. The halo moves along with the dog's neck, so it does not hinder the dog from turning its head and restricting its movements. The halo is compact and stays in place with the cushion on the upper portion of the neck. This provides enough cushion to keep the dog comfortable, while providing a sturdy protective barrier to keep it safe from colliding into any objects and preventing injury. It is lightweight and eliminates the problems and restraints of all of the other previous devices. The shape of the neck cushion extends outward, protecting the dog's shoulders, while providing a nice cushion and a bumper on the sides of the dog, so that it can feel its way when walking beside a wall and further guide it down a walkway. It guides and protects the dog and allows it to perform its normal daily activities without the burden of the device getting in the way. It also improves the quality of life of a visually impaired dog and gives it confidence to move around again, without the fear of injury and does not inhibit its movements in any way.

Accordingly, the objects and advantages of this device become very apparent:

(a) To provide a blind animal halo guide that is not cumbersome and does not inhibit the natural activities of the animal, giving it more freedom while protecting and guiding it.

(b) To provide a blind animal halo guide that has enough cushion and materials for the comfort of the animal and excludes parts that get in the way of licking, eating, drinking, resting or sleeping and letting the animal participate in its normal daily activities.

(c) To provide a blind animal halo guide that has cushioning around the top portion of the neck area only and provides a compact design, for maximum comfort. It also provides a smaller halo by being closer to the animal's head and neck area protecting its eyes, nose, head and shoulders.

(d) To provide a blind animal halo guide that provides cushion on the upper portion of the neck area, to accommodate and to hold the protective halo in place, without unnecessary cushion or any other obstructions under the lower neck and chin area. The animal can bend its neck and position its chin from side to side, up and down, therefore allowing all the movements necessary for normal daily activities.

(e) To provide a blind animal halo guide that allows the animal to move its chin in a downward position, to accommodate the halo to move out of the way when the animal is eating and drinking.

(f) To provide a blind animal halo guide that does not get in the way while the animal eats and drinks, so that the halo does not get wet and dirty with food and water.

(g) To provide a blind animal halo guide that easily disengages and separates from the cushion and halo attachments, so that the animal can easily get out of any entanglements with objects.

(h) To provide a blind animal halo guide that is completely comfortable for the animal, allowing it to move around without discomfort, and to perform activities of daily living without any inhibitions from the device.

(i) To provide a blind animal halo guide that sits conveniently on the collar portion of the harness and secures it to the top portion of the animal's neck. This allows the neck cushion to conform and fit snugly, while holding the protective halo securely in place to protect the animal from bumping into objects.

Figure 1:
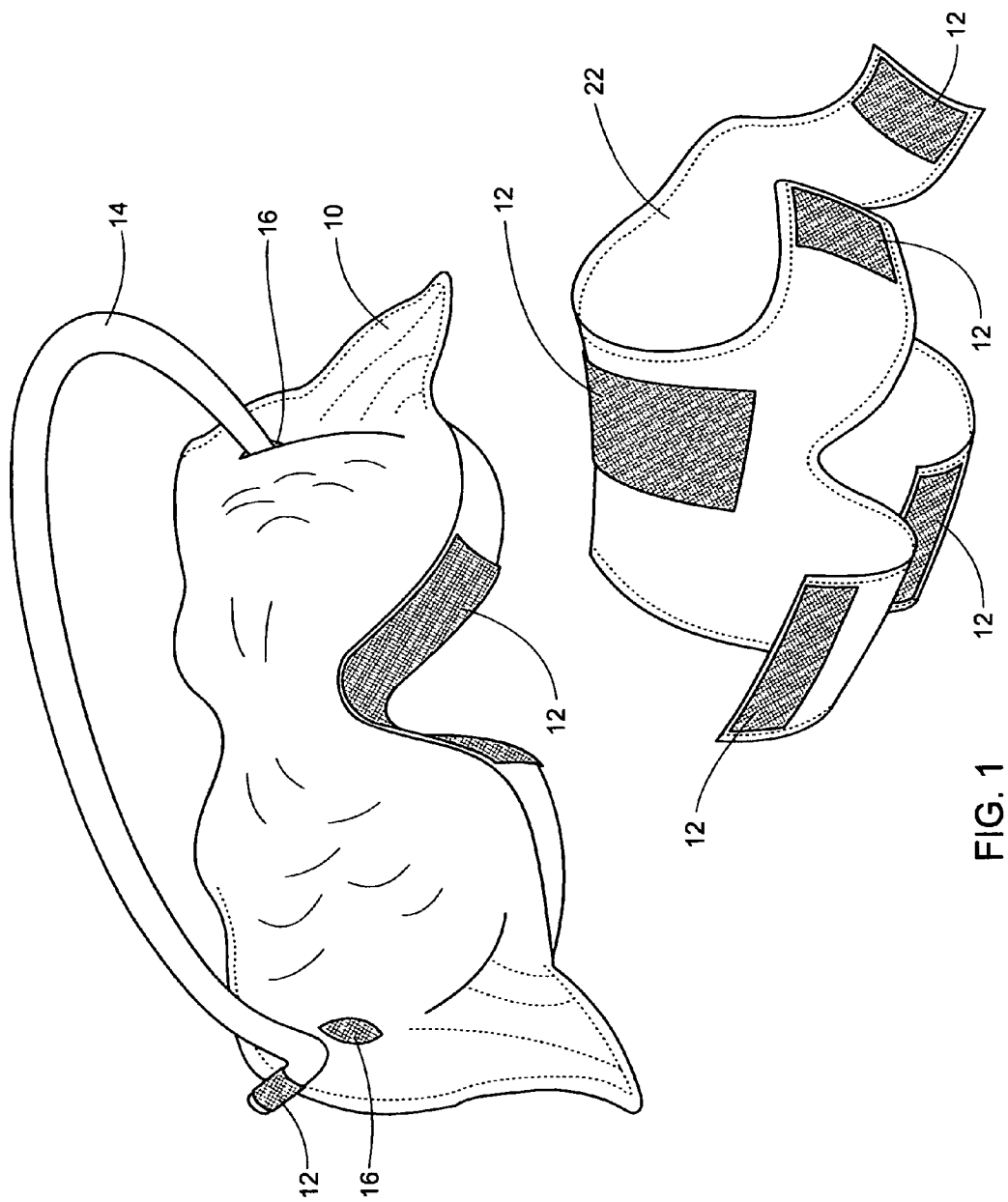
FIG. 1 Shows a perspective view of the blind animal halo guide unassembled.
Figure 2:
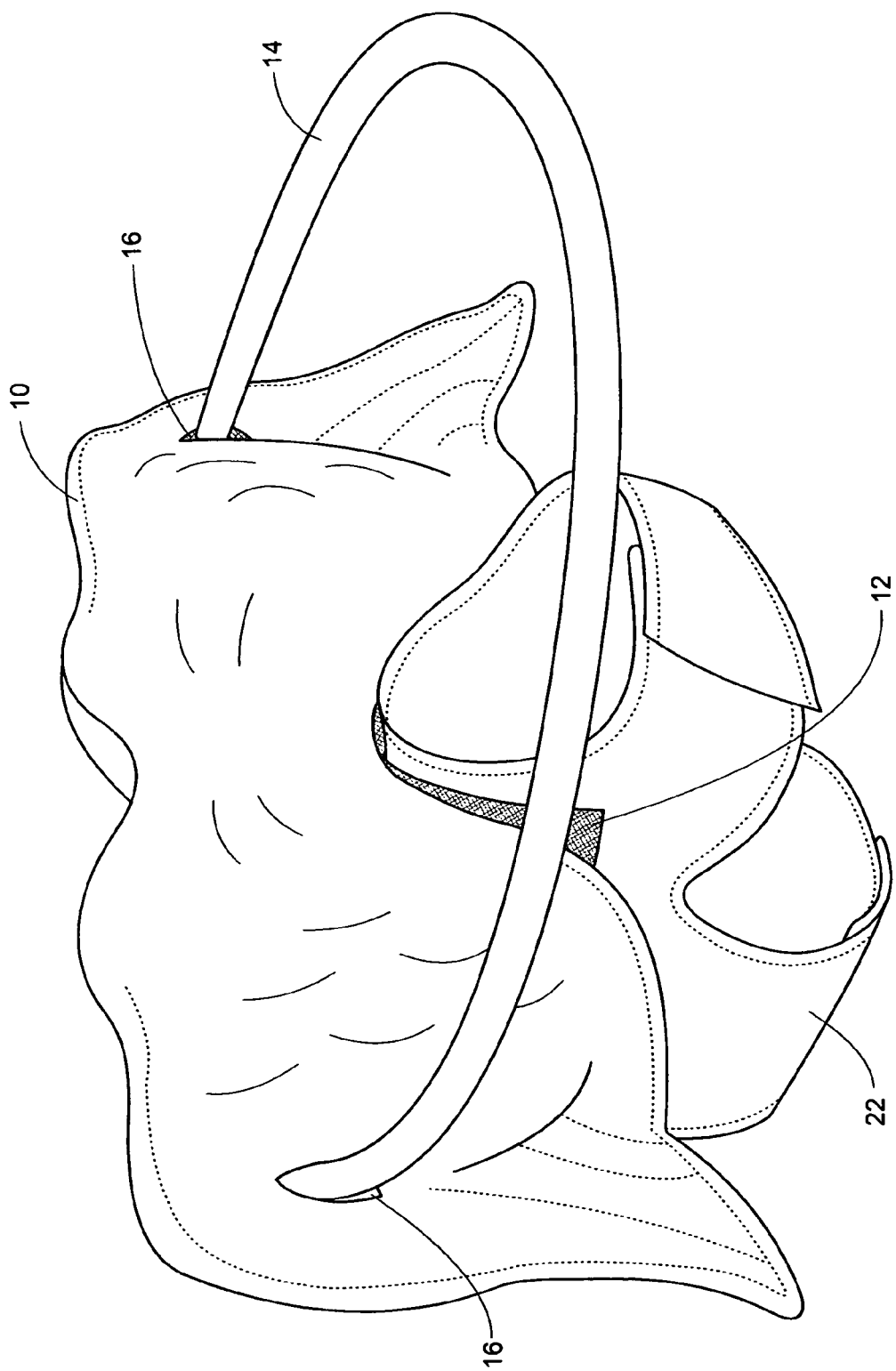
FIG. 2 Shows a perspective view of the blind animal halo guide assembled.
Figure 3:
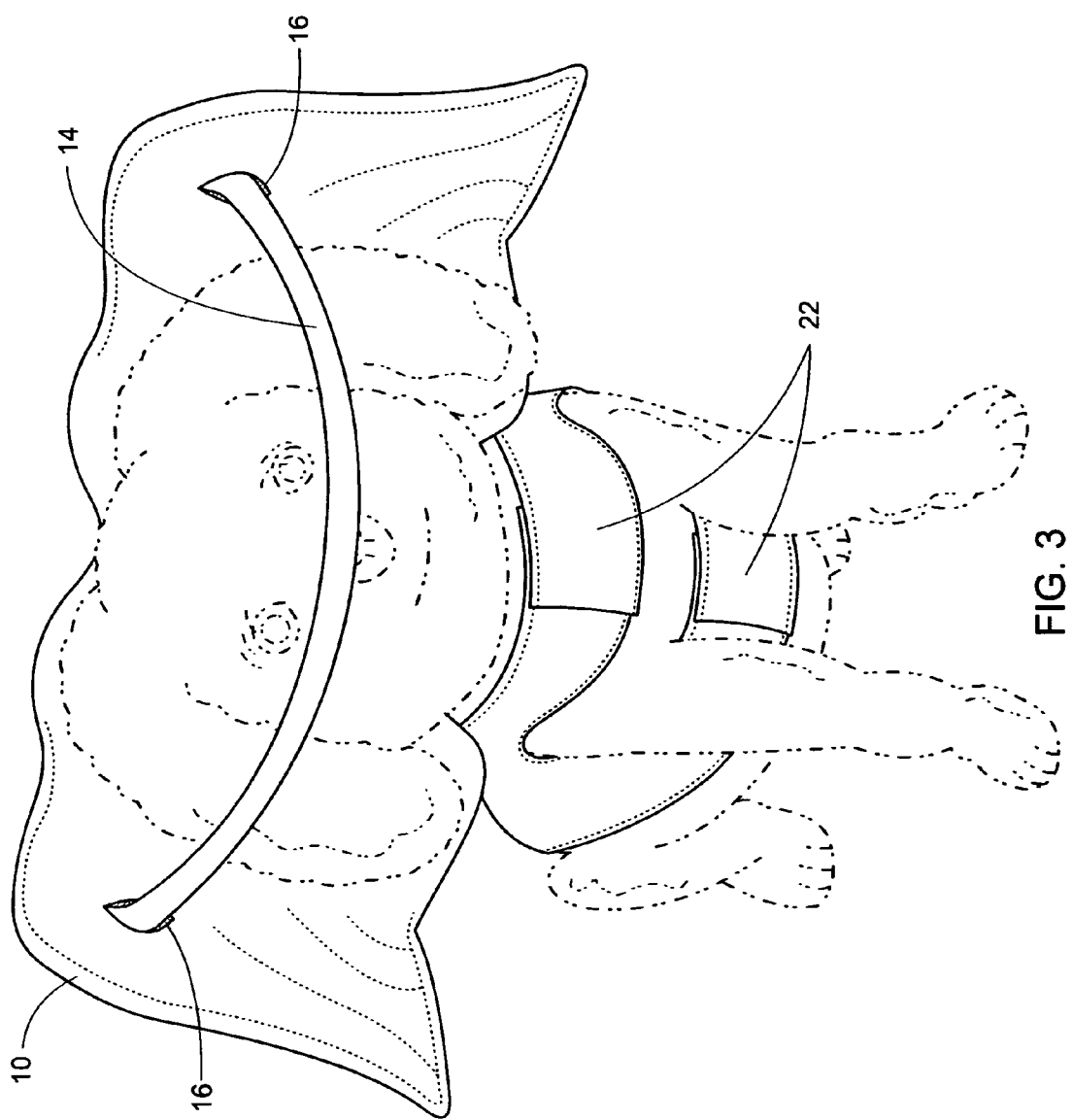
FIG. 3 Shows a front view of the blind animal halo guide while in use on a dog.

DRAWINGS—REFERENCE NUMERALS 10 neck cushion
12 hook and loop material
14 halo
16 openings
22 harness Description of the Drawings FIG. 1-3

The invention in the preferred embodiment described below is for a dog. The device consists of a harness 22 that holds a sturdy neck cushion 10 onto the upper circumference of the dog's neck. The neck cushion 10 has hook and loop material 12 on the bottom portion, that attaches it to the upper neck portion of the dog's harness 22. The neck cushion 10 extends far enough down around the dog's neck, to provide a stable place for a protective halo 14 to be attached for protecting the dog from colliding into objects. The neck cushion 10 extends outward onto the sides of the dog, away from the dog's head to hold a protective halo 14 in place. The neck cushion 10 extends far enough away from the dog's neck and head to allow the halo 14 to guide and to protect the dog's head, eyes, nose, and its shoulders, from bumping into objects. The neck cushion 10 has two small openings 16, with hook and loop material 12 inside, to secure the two ends of the halo 14 in place onto the neck cushion 10. The hook and loop material 12 holds the halo 14 in its protective position securely onto the outer edge of the neck cushion 10. The neck cushion 10 is a pillow fully packed and stuffed with foam and is compact and firm enough to hold its shape. It is also soft enough for comfort and provides a sturdy matrix for the halo 14 to be firmly attached to. The neck cushion 10 firmly holds the ends of the halo 14 in place, to provide a protective barrier and bumper for the dog. The collar portion of the harness 22, along with the neck cushion 10, and the halo 14 are held in place onto the dog's neck, to secure the device in its protective position around its head and neck area. The outer portion of the cushion 10 extents the halo 14 outward from the dog's neck to hold the halo 14 far enough away from its head for maximum protection, without being heavy or cumbersome. The neck cushion 10 does not extend too far down past the upper portion of the circumference of the dog's neck, so that the dog can easily move its chin up and down and from side to side. The halo 14 is held in the perfect protective position, while maintaining maximum comfort and allowing uninhibited movement for the visually impaired dog.

DETAILED DESCRIPTION AND OPERATIONS—FIGS. 1-3

FIG. 1 Shows a perspective view of the blind animal halo guide unassembled. The blind animal halo guide has a neck cushion 10 along with a protective halo 14 that is attached to the dog harness 22. The neck cushion 10 is made with durable yet soft foam and is encased in lightweight material. The neck cushion 10 has two small openings 16 that have hook and loop material 12 inside and it holds the two ends of a protective halo 14, which also has hook and loop material 12 on the ends. The halo 14 is made with rigid but flexible plastic, or vinyl, with wire inside. The neck cushion 10 has a flat and rounded area, on the bottom portion, that molds around the top circumference of the dog's neck. This flat area has hook and loop material 12 and it holds the neck cushion 10 and halo 14 together securely, onto the upper neck area of the dog harness 22. The harness 22 also has hook and loop material 12 to hold the neck cushion 10 firmly in place. The small openings 16 in the neck cushion 10 holds the ends of the halo 14 firmly, onto the neck cushion 10 to extend it outward, in front of the dog's eyes and nose. The harness 22 holds the neck cushion 10 and halo 14 in place, to guide and to protect the visually impaired dog from bumping into objects. The halo 14 is adjustable by being constructed of wire and vinyl tubing, or bendable plastic material with wire inside, so the height of the halo 14 can be adjusted, according to the size and height of the dog, by bending the ends of the halo 14 accordingly. The hook and loop material 12 provides a quick release for any entanglements the dog gets into. This particular embodiment has a neck cushion 10 shaped like angel wings for novelty and appearance purposes only.

FIG. 2 Shows a perspective view of the blind animal halo guide assembled. The neck cushion 10 holds the halo 14 in place inside the two openings 16 in the neck cushion 10. The neck cushion has hook and loop material 12 on the bottom, where it fits around the upper portion of the dog's neck area. The harness 22 also has hook and loop material 12 on the upper portion of the neck area, to secure the bottom of the neck cushion 10 to it. The harness 22 has hook and loop material 12 to secure it onto the dog. This provides a sturdy fit and provides stability for the neck cushion 10 and halo 14 to stay in place, in its protective position, on the upper portion of the dog's neck area.

FIG. 3 Shows a front view of the blind animal halo guide in use on a dog. The harness 22 is placed onto the dog's body. The neck cushion 10 holds the ends of the halo 14 inside the small openings 16 securely. Together the neck cushion 10 and the halo 14 are placed onto the collar portion of the harness 22. The hook and loop material 12 secures it in a protective position, on the upper portion of the dog's neck area. The neck cushion 10 provides comfort to the dog. It is lightweight, and it moves with all of the dog's movements for everyday activities. The neck cushion 10 also provides the perfect girth, so that the halo 14 can span out on the sides of the dog, to guide it against walls and other objects on the side of the dog. This device is lightweight, not cumbersome, and gives the dog free range and movement, while being fully protected. This allows the dog to participate in most normal activities of daily living, without fear of injury.

Figure 4:
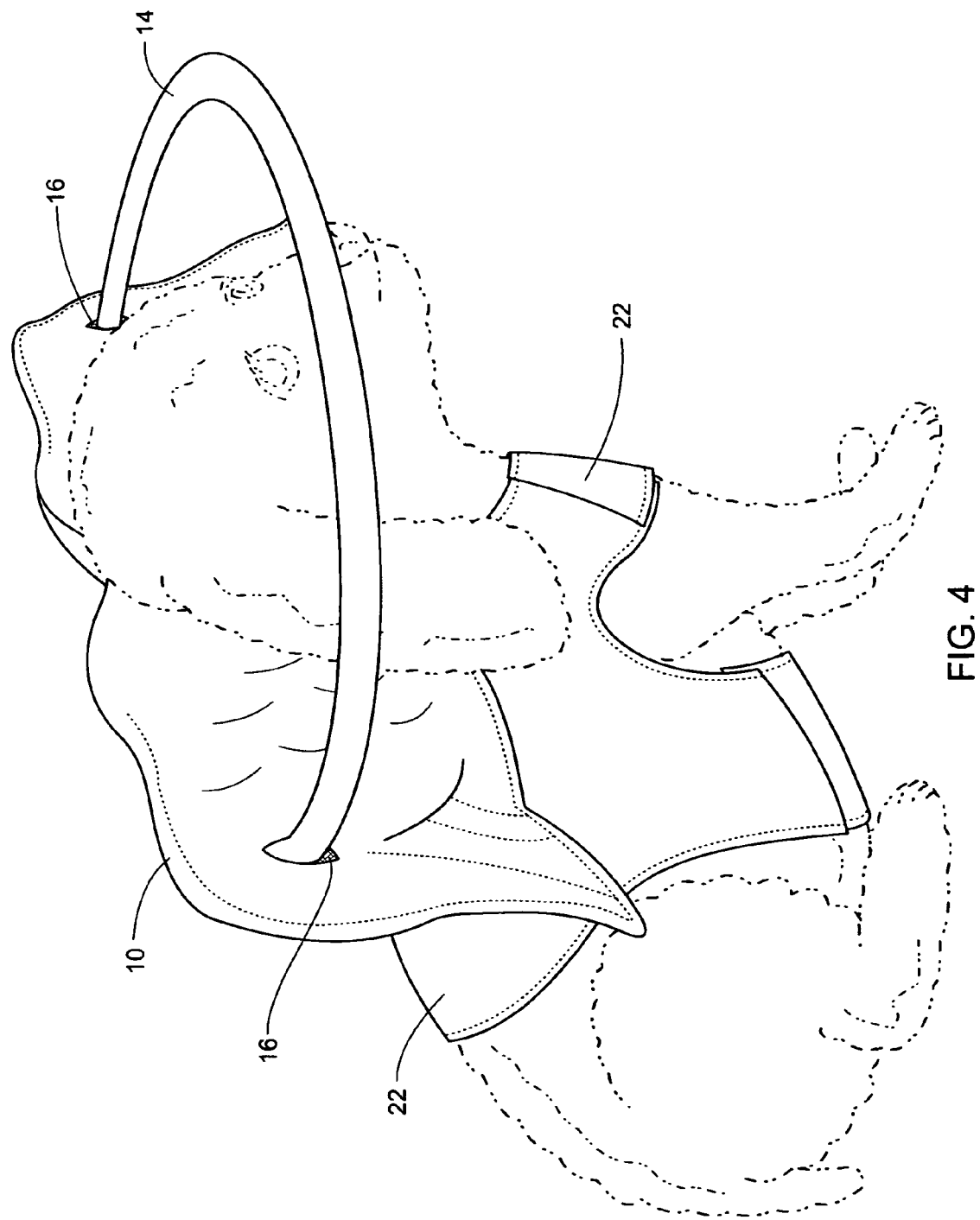
FIG. 4 Shows a side view of the blind animal halo guide while in use on a dog.

FIG. 4 Shows a side view of the blind animal halo guide in use on a dog. The neck cushion 10 holds the halo 14 by the ends, in the small openings 16 in the neck cushion 10. The neck cushion 10 spans out away from the dog's neck and head area, so that the halo 14 can encircle the dog's head in front of the eyes and nose. The neck cushion 10 is soft, yet durable and provides stability for the halo 14 to stay in place, protecting the dog's eyes, nose, head and shoulder area. The neck cushion 10 helps the blind animal halo guide to fit snugly and securely around the dog's neck area, to provide enough stability for the halo 14 for maximum protection. The halo 14 guides the dog and provides the perfect lightweight bumper, for protecting the dog's eyes, nose, head, and shoulder area. The dog collar portion of the harness 22 conveniently holds the neck cushion 10 firmly in place, around the top portion and circumference of the dog's neck. The ends of the halo 14 are bendable, so that the halo 14 can be adjusted to the dog's size and can be placed up or down, to the preference of the dog owner to fit the dog. This device allows the dog to have ample movement of the neck area, to do its everyday activities, including eating, drinking, licking, moving its head from side to side, and sleeping, without any inhibitions that other devices have caused. The neck cushion 10 does not extend too far down past the upper portion and circumference of the dog's neck area, so that the dog can easily move its head and chin up and down, and also from side to side, for the natural movement, without any restraints. The halo 14 remains in place at eye level, and moves along with the dog's neck and shoulders, to make sure movement of the dog is not hindered in any way. This device guides and protects a visually impaired dog, while not restraining it from participating in normal daily activities, thus improving the dog's quality of life. This gives the dog protection and confidence to perform its activities in comfort, without the fear of injury.

From the descriptions above a number of advantages of the blind animal halo guide become evident:
(a) Provides ample movement for the dog while protecting it from injury at the same time.
(b) Provides enough cushion for the dog's comfort, while providing maximum protection and safety to the dog.
(c) Provides a smaller and more compact device, so that the dog can easily adapt to it, without it being cumbersome by being closer to the dog's neck, shoulder and head area.
(d) Provides the dog the ability to move, while not hindering the movement of the neck and chin from side to side, up and down to eat, drink, take a nap, lick itself, or to sleep.
(e) It does not hinder the movement of the chin downward to accommodate the halo, so that it can eat and drink effortlessly, without the halo getting in the way of its food and water bowl.
(f) It does not get food and drink spilled on it, so the dog owner does not have to clean it as often.
(g) It easily disengages with hook and loop material in case of any entanglements with any object.
(h) Provides maximum movement without hindering any of the dog's daily activities, while providing comfort, protection and guidance, to the visually impaired dog.
(i) It provides a comfortable fitting on the upper portion of the dog's neck, by being secured to the collar portion of the harness.

Conclusion, Ramifications, and Scope

Accordingly, the reader will see that the blind animal halo guide is comfortable and allows the dog to move around and perform its daily activities, without the device getting in the way. It conveniently guides the visually impaired dog and protects it from harm. Although the descriptions above contain many specifics, this device can be embodied in other forms and shapes, as long as it accomplishes the same task. Other embodiments of this invention can be made to fit with a collar or other harness-type fitting. It can also include other attachments besides the preferred hook and loop for the halo, that would also allow for a quick release, such as snaps. The neck cushion can be different shapes such as butterfly wings, rounded, triangular or square shapes, for novelty purposes. The material in the neck cushion can also be cotton or memory foam to keep its shape. The device can also be made with a neck cushion and a halo that is sold without a collar or a harness. It can be made to conveniently fit and adjust onto any collar or harness. The hook and loop material can be replaced by snaps, buckles or other types of materials, to secure the neck cushion and harness onto the dog. The halo can be a flat piece of clear plastic, so that the dog's face can be seen through the halo by the dog owner. This device can also be made for other animals, not just for dogs as in the preferred embodiment.

Although the description above contains many specifics, these should not be construed as limiting the scope of the embodiment, but as merely providing illustrations of the presently preferred embodiment. Thus the scope of the embodiment should be determined by the appended claims and their legal equivalent, rather than by the example given.

I claim:

1. An apparatus for protecting blind animals comprising:
   A neck cushion, said neck cushion having a defined shape for engaging the rear portion of an animal's head;
   A halo attached to said neck cushion for extending around the side and front portion of said animal's head;
   Wherein said neck cushion includes at least one opening(s) located within said neck cushion, wherein said at least one opening(s) includes one of a fastener within said opening(s);
   Said halo including a corresponding fastener on said halo so that upon insertion of said halo into said at least one opening[s], said corresponding fastener is engaged to secure said halo within said neck cushion, and
   wherein said neck cushion comprises a connector located on a bottom portion of said cushion for engagement with a mating connector affixed to an animal restraint device for attachment of said neck cushion to the animal.

2. The apparatus of claim 1, wherein said neck cushion is comprised of a durable, soft foam encased within a lightweight material.

3. The apparatus of claim 1, wherein said halo is comprised of semi-rigid or flexible material, wherein said material allows for the molding of the halo to animals of various sizes.

4. The apparatus of claim 1, wherein said neck cushion comprises a flat and rounded area on the bottom portion for molding around the top circumference of the animal's neck.

5. The apparatus of claim 1, wherein said animal restraint device is either an animal harness or collar.

6. The apparatus of claim 1, wherein said neck cushion defined shape is selected from the group comprising: half-circular, butterfly wing, rounded, triangular, angel winged, square shaped or other novelty shapes.

7. The apparatus of claim 1, wherein said connector is chosen from the group comprising: snaps, buckles, hook and loop fastener, or other materials.

8. The apparatus of claim 1, wherein said fastener and corresponding is chosen from the group comprising: snaps, buckles, hook and loop fastener, or other materials.

* * * * *